(12) United States Patent
Wilkin

(10) Patent No.: US 9,802,454 B2
(45) Date of Patent: Oct. 31, 2017

(54) PLASTIC SPRING SEAT HAVING INTEGRATED CRASH MEMBER

(71) Applicant: Tenneco Automotive Operating Company Inc., Lake Forest, IL (US)

(72) Inventor: Julien Wilkin, Fraiture (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 15 days.

(21) Appl. No.: 14/806,776

(22) Filed: Jul. 23, 2015

(65) Prior Publication Data

US 2016/0023529 A1 Jan. 28, 2016

Related U.S. Application Data

(60) Provisional application No. 62/029,618, filed on Jul. 28, 2014.

(51) Int. Cl.
*F16F 5/00* (2006.01)
*B60G 15/06* (2006.01)
(Continued)

(52) U.S. Cl.
CPC ......... *B60G 15/063* (2013.01); *B60G 15/062* (2013.01); *F16F 1/12* (2013.01);
(Continued)

(58) Field of Classification Search
CPC .......... B60G 15/063; B60G 2204/1242; B60G 15/062; B60G 2204/124; B60G 2204/12422; B60G 13/001; F16F 9/54
(Continued)

(56) References Cited

U.S. PATENT DOCUMENTS 2,147,660 A 2/1939 Loewus
3,857,726 A 12/1974 Van Gils
(Continued)

FOREIGN PATENT DOCUMENTS

DE 102008043527 A1 5/2010
DE 102010028290 A1 11/2011
(Continued)

OTHER PUBLICATIONS

Matthij, Paul, et al., "Tailored Fiber Placement-Mechanical Properties and Applications", Journal of Reinforced Plastics and Composites, Jun. 1998, pp. 774-786, vol. 17, No. 9, Technomic Publishing, US.

(Continued)

*Primary Examiner* — Anna Momper
*Assistant Examiner* — Mahbubur Rashid
(74) *Attorney, Agent, or Firm* — Harness, Dickey & Pierce, P.L.C.

(57) ABSTRACT

The present disclosure relates to a strut assembly for use with a vehicle. The strut assembly has a shock absorber having a shock absorber tube, a lower spring seat, a tubular member and a coil spring. The lower spring seat supports one end of the spring and includes a tubular member having an inner wall surface, and is configured to receive the shock absorber tube therein. The lower spring seat has an annular member extending radially outwardly from the tubular member with a surface for supporting the one end of the coil spring thereon. The tubular member has a portion constructed to deform and collapse in response to a predetermined excessive force experienced by the shock absorber.

16 Claims, 4 Drawing Sheets

(51) Int. Cl.
*F16F 1/12* (2006.01)
*F16F 9/32* (2006.01)

(52) U.S. Cl.
CPC ...... *F16F 9/3207* (2013.01); *B60G 2202/312* (2013.01); *B60G 2204/1242* (2013.01)

(58) Field of Classification Search
USPC .............................. 267/140.11–140.15, 221
See application file for complete search history.

(56) References Cited

U.S. PATENT DOCUMENTS

| | | | |
|---|---|---|---|
| 4,119,748 A | 10/1978 | Verbauwhede et al. | |
| 4,366,969 A * | 1/1983 | Benya | B60G 15/063 267/117 |
| 4,462,608 A | 7/1984 | Lederman | |
| 4,562,997 A | 1/1986 | Iwata et al. | |
| 4,683,993 A * | 8/1987 | Tanabe | B60G 15/063 188/321.11 |
| 5,454,585 A | 10/1995 | Dronen et al. | |
| 5,467,971 A | 11/1995 | Hurtubise et al. | |
| 5,553,713 A | 9/1996 | Sydekum et al. | |
| 5,620,172 A | 4/1997 | Fulks et al. | |
| 5,664,892 A | 9/1997 | Kellam | |
| 5,788,262 A * | 8/1998 | Dazy | B60G 15/063 188/321.11 |
| 6,126,155 A | 10/2000 | Smith et al. | |
| 6,155,544 A | 12/2000 | Solomond et al. | |
| 6,273,407 B1 | 8/2001 | Germano | |
| 6,367,830 B1 * | 4/2002 | Annequin | B60G 15/063 280/124.145 |
| 6,382,648 B1 * | 5/2002 | Handke | B60G 15/063 267/170 |
| 6,398,201 B1 | 6/2002 | Solomond et al. | |
| 6,412,879 B1 | 7/2002 | Ogoniek et al. | |
| 6,692,012 B2 | 2/2004 | Fullenkamp et al. | |
| 7,077,390 B2 * | 7/2006 | Miller | B60G 15/063 267/221 |
| 7,090,058 B2 | 8/2006 | Miyazaki et al. | |
| 7,416,175 B2 | 8/2008 | Al-Dahhan | |
| 8,109,492 B2 | 2/2012 | Winocur | |
| 8,196,941 B2 | 6/2012 | Nowak | |
| 8,348,029 B2 | 1/2013 | Winocur | |
| 8,382,080 B2 | 2/2013 | Suchta et al. | |
| 8,496,383 B2 | 7/2013 | Viault et al. | |
| 8,616,538 B2 | 12/2013 | Al-Dahhan et al. | |
| 8,696,004 B2 | 4/2014 | Baker et al. | |
| 8,939,439 B2 | 1/2015 | Corbett et al. | |
| 2002/0158393 A1 | 10/2002 | Handke et al. | |
| 2003/0047399 A1 * | 3/2003 | Miller | B60G 15/063 188/322.19 |
| 2003/0218286 A1 * | 11/2003 | Miyazaki | B60G 11/52 267/220 |
| 2004/0051270 A1 * | 3/2004 | Causemann | B60G 15/063 280/124.146 |
| 2004/0074589 A1 | 4/2004 | Gessler et al. | |
| 2004/0159993 A1 * | 8/2004 | Miller | B60G 15/063 267/179 |
| 2007/0194507 A1 * | 8/2007 | Kato | B60G 11/16 267/179 |
| 2009/0166940 A1 | 7/2009 | Lutz | |
| 2010/0032877 A1 | 2/2010 | Suchta et al. | |
| 2010/0230877 A1 * | 9/2010 | Schudt | F16F 1/377 267/220 |
| 2011/0266765 A1 * | 11/2011 | Nowak | B60G 11/16 280/124.154 |
| 2012/0181127 A1 | 7/2012 | Keil et al. | |
| 2013/0052392 A1 | 2/2013 | Radlmayr et al. | |
| 2013/0147149 A1 | 6/2013 | Baker et al. | |
| 2014/0045400 A1 | 2/2014 | Vandewalle | |
| 2015/0123329 A1 | 5/2015 | Toyota | |
| 2016/0023529 A1 | 1/2016 | Wilkin | |
| 2016/0031282 A1 | 2/2016 | Hernette et al. | |
| 2016/0137017 A1 | 5/2016 | Wilkin | |
| 2016/0185177 A1 | 6/2016 | Kaneko et al. | |

FOREIGN PATENT DOCUMENTS

| | | |
|---|---|---|
| DE | 102011051403 A1 | 1/2013 |
| DE | 10312085 B4 | 10/2014 |
| EP | 567845 A1 | 11/1993 |
| EP | 1483137 B1 | 4/2007 |
| EP | 2960542 A1 | 12/2015 |
| GB | 2347906 A | 9/2000 |
| JP | 2010116113 A | 5/2010 |
| WO | 0144549 A1 | 6/2001 |
| WO | 03076234 A1 | 9/2003 |
| WO | 2004101909 A1 | 11/2004 |
| WO | 2005118263 A1 | 12/2005 |
| WO | 2009062764 A1 | 5/2009 |
| WO | 2013041254 A1 | 3/2013 |
| WO | 2013041255 A1 | 3/2013 |

OTHER PUBLICATIONS

Crothers, P.J., et al., "Tailored Fibre Placement to Minimise Stress Concentrations", Composites Part A: Applied Science and Manufacturing, Jan. 1, 1997, pp. 619-625, vol. 28A, Elsevier Science Publishers B.V., Amsterdam, NL.

* cited by examiner

PLASTIC SPRING SEAT HAVING INTEGRATED CRASH MEMBER

CROSS-REFERENCE TO RELATED APPLICATIONS

This application claims the benefit of U.S. Provisional Application No. 62/029,618, filed on Jul. 28, 2014. The entire disclosure of the above application is incorporated herein by reference.

FIELD

The present disclosure relates to a spring seat, and more particularly to a lower spring seat for supporting a coil spring of a vehicular suspension system.

BACKGROUND

This section provides background information related to the present disclosure which is not necessarily prior art.

Strut-type suspension systems are well known in the motor vehicle industry. A telescopic strut assembly normally incorporating a hydraulic damper is used as one of the locating members for the wheel of the motor vehicle. A strut assembly typically includes a coil spring concentrically disposed around a shock absorber. The coil spring extends between an upper spring seat which is a part of a top mount assembly for the strut assembly and a lower spring seat which is attached to the shock absorber of the strut assembly.

The lower spring seat can be a single piece made of metal or plastic. A plastic spring seat is light weight than its metal counterpart. The lower spring seat typically includes an annular member that supports the lower end of the spring and a tubular member which extends from the annular member. The tubular member is designed to interface with an outer tube of the shock absorber. For example, FIG. 1 illustrates a lower spring seat 200, which is made of plastic, disposed about an outer tube 202 of a shock absorber. The lower spring seat 200 is retained by a support ring 204 which is welded to the outer tube 202. More particularly, a tubular member 206 of the lower spring seat 200 abuts the support ring 204.

The spring seat supports and maintain the correct position of the spring under various driving conditions of the vehicle. The spring seat resists braking loads, wear, abrasion, changing loads and hits by stones and other debris. During severe impact in which the spring fails, the spring seat is designed to withstand and support the spring. For example, a lower spring seat made of plastic may include a steel or rubber pad disposed on the lower spring seat which absorbs the energy in the event the spring fails. To avoid using such a pad on the whole lower spring seat, a spring sleeve is also mounted on the spring. The spring sleeve delays any failure due to early corrosion. However, the use of the added components like the pad and the spring sleeve further increases the cost of the lower spring seat and the overall cost of a strut assembly in which it is incorporated.

SUMMARY

This section provides a general summary of the disclosure, and is not a comprehensive disclosure of its full scope or all of its features.

In one aspect the present disclosure relates to a strut assembly for use with a vehicle. The strut assembly may include a shock absorber having a shock absorber tube, a lower spring seat, a tubular member and a coil spring. The lower spring seat may support one end of the spring and include a tubular member having an inner wall surface, and configured to receive the shock absorber tube therein. The lower spring seat may also include an annular member extending radially outwardly from the tubular member and having a surface for supporting the one end of the coil spring thereon. The tubular member may have a portion constructed to deform and collapse in response to a predetermined excessive force experienced by the shock absorber. This allows the excessive force to be accommodated by the strut assembly without significantly affecting an integrity of the annular member, thus enabling the coil spring to be retained by the strut assembly.

In another aspect the present disclosure relates to a strut assembly for use with a vehicle. The strut assembly may include a shock absorber having a shock absorber tube, a coil spring and a lower spring seat. The lower spring seat may be used for supporting one end of the spring. The lower spring may include a tubular member having an inner wall surface, and configured to receive the shock absorber tube therein, as well as a support ring. The support ring may be secured to a portion of the shock absorber tube and disposed adjacent the tubular member to support the tubular member thereon. The tubular member may further include a primary member and a reinforcement member on the inner wall surface. The primary member is configured to deform, so as to be compressed, in response to a predetermined excessive force experienced by the shock absorber, such that the tubular member is supported by the reinforcement member on the support ring after the deformation.

In still another aspect the present disclosure relates to a strut assembly for use with a vehicle. The strut assembly may include a shock absorber having a shock absorber tube, a coil spring and a lower spring seat for supporting one end of the spring. The lower spring seat may include a tubular member having an inner wall surface which is configured to receive the shock absorber tube therein. A metallic support ring is included which is fixed securely to a portion of the shock absorber tube, and disposed adjacent the tubular member to support the tubular member thereon. The tubular member further includes a primary member and a reinforcement member on the inner wall surface. The primary member is configured to deform, so as to be compressed, in response to a predetermined excessive force experienced by the shock absorber, such that the tubular member is supported by the reinforcement member on the support ring after the deformation. The reinforcement member includes at least one of a tapering wall portion or a series of interspersed, circumferential grooves and ribs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
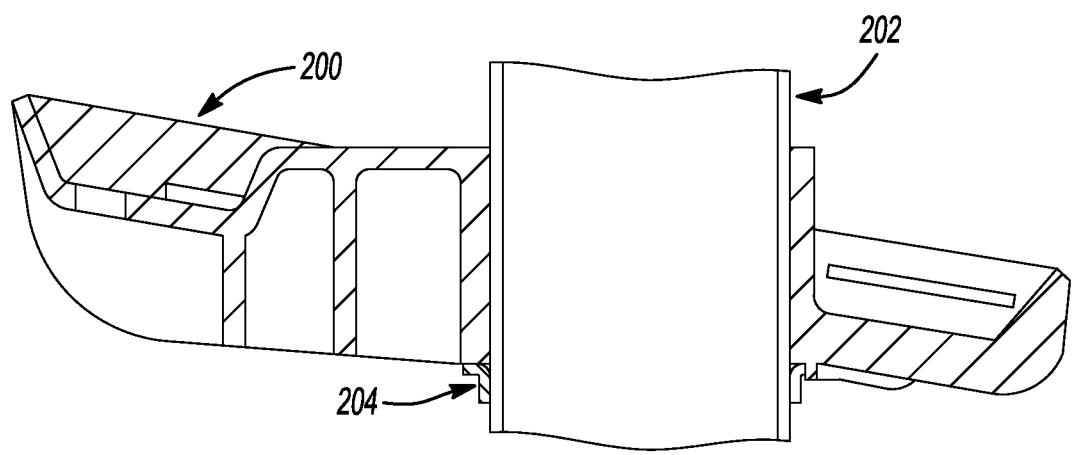
FIG. 1 illustrates a prior art assembly of a lower spring seat and a support ring disposed about a tube of a shock absorber.
Figure 2A:
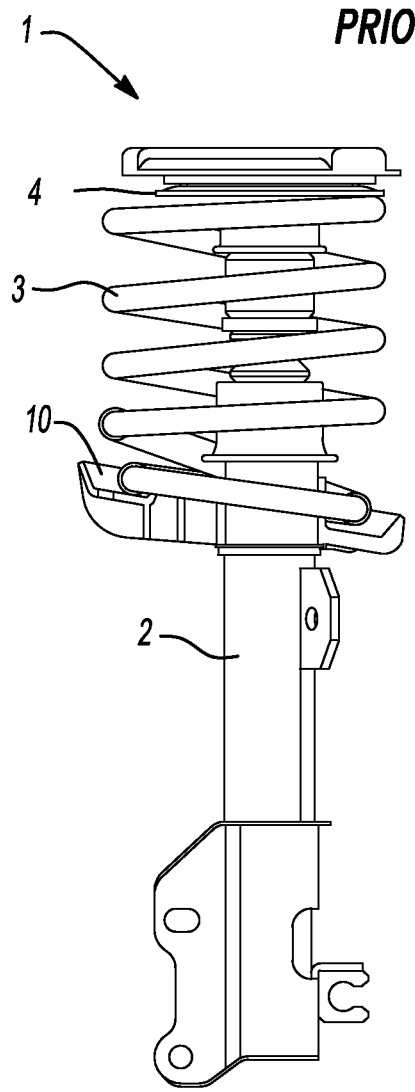
FIG. 2A illustrates in a strut assembly incorporating a lower spring seat in accordance with one embodiment of the present disclosure.

The present disclosure will now be described more fully with reference to the accompanying drawings. The following description is merely exemplary in nature and is not intended to limit the present disclosure, application or uses. A vehicle includes a suspension system (front and rear suspension) having a strut assembly 1 in accordance with one embodiment of the present disclosure, as shown in FIG. 2A, at each of the wheels. The strut assembly 1 includes a shock absorber 2 and a coil spring 3 disposed concentrically around the shock absorber. The coil spring 3 is disposed between an upper spring seat 4 and a lower spring seat 10. The present disclosure relates in particular to the design and construction of the lower spring seat 10.

Figure 2B:
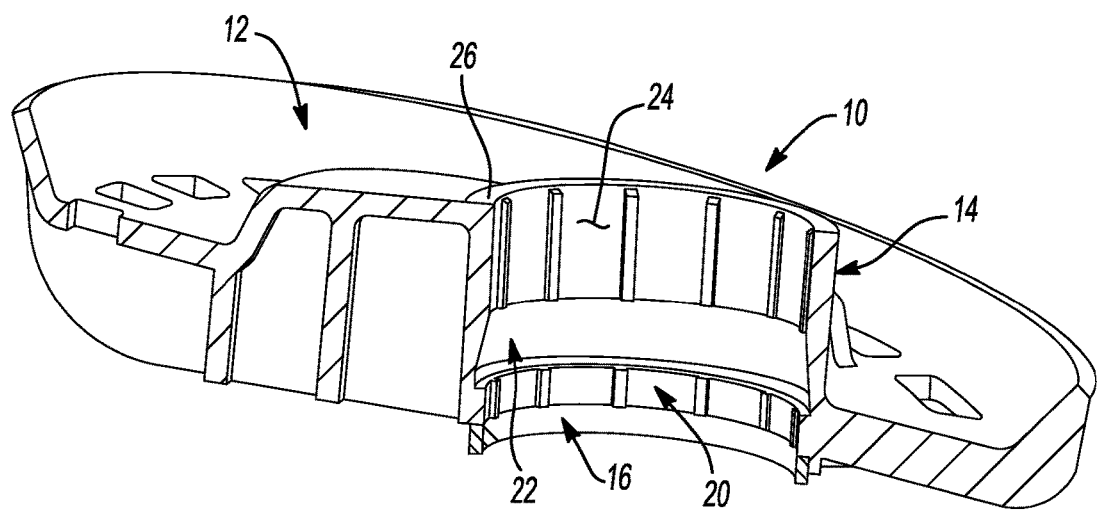
FIG. 2B illustrates a first embodiment of a lower spring seat of the present disclosure.

FIG. 2B illustrates the lower spring seat 10 in greater detail. The lower spring seat 10 has an annular member 12, a tubular member 14 extending from the annular member 12, and a support ring 16. When installed in the strut assembly, the coil spring sits on the annular member 12 of the lower spring seat 10, and the tubular member 14 and the support ring 16 are concentrically disposed around a tube of the shock absorber. The support ring 16 is made of metal and is fixedly attached to the tube by way of, for example, welding, brazing, etc. The tubular member 14 abuts the support ring 16 such that the support ring 16 supports and fixes the position of the lower spring seat 10 along the tube of the shock absorber.

The lower spring seat 10 is made of plastic. The lower spring seat 10 is designed to absorb forces exerted by the coil spring during various operating conditions, such as in full compression, rebound and jounce (i.e., normal operating conditions). Furthermore, the lower spring seat 10 is designed to deform when a severe load is received, such as when the coil spring fails due to a severe impact. The deformation of the lower spring seat 10 dissipates the energy of the impact without harming the rest of the components of the strut assembly.

Figure 3:
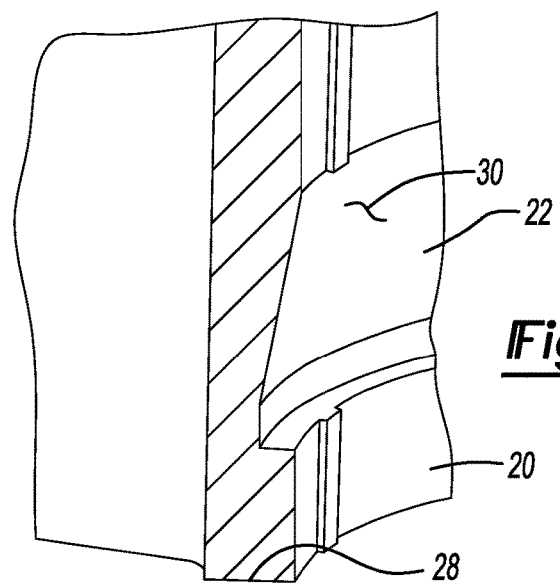
FIG. 3 illustrates an enlarged view of a primary member and a reinforcement member of the lower spring seat of FIG. 2B.

To enable it to absorb energy during normal operating conditions and to deform at a severe operating condition, the lower spring seat 10 includes a primary member 20 and an energy dissipation member 22 (FIGS. 2 and 3). The primary member 20 and the energy dissipation member 22 are part of the tubular member 14. The primary member 20 is a lower seat of the tubular member 14 which abuts with the support ring 16. More particularly, an inner wall 24 of the tubular member 14 extends from a first end 26 to a second end 28. The support ring 16 abuts the second end 28, which is part of the primary member 20.

The energy dissipation member 22 is positioned above the primary member 20, such that the primary member 20 is between the energy dissipation member 22 and the support ring 16. The energy dissipation member 22 has an angled wall 30 which circumferentially extends along the inner wall 24 of the tubular member 14. More particularly, the angled wall 30 tapers toward the primary member 20.

Figure 4:
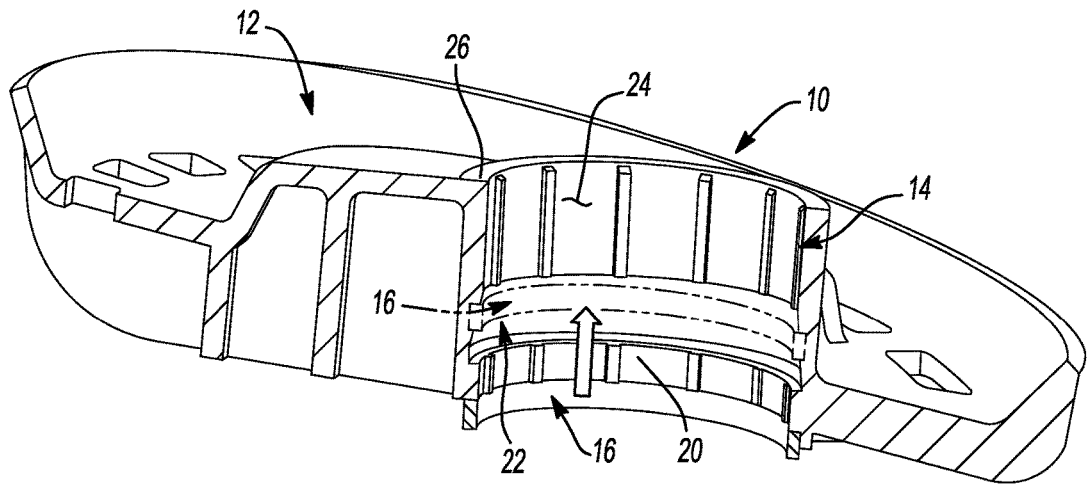
FIG. 4 illustrates a position of the lower spring seat relative to a support ring before and after a deformation of the primary member.

The primary member 20 transfers the load from the coil spring to the support ring 16 during normal operating conditions. When a severe impact is received, such as an impact that causes the failure of the coil spring, the primary member 20 is designed to deform. Specifically, with reference to FIG. 4, the primary member 20 collapses, such that the lower spring seat 10 moves down and the support ring 16 interfaces with the energy dissipation member 22. Due to the angled wall 30 and the friction between the lower spring seat 10 and the support ring 16, the energy dissipation member 22 clamps on the support ring 16. The interference between the energy dissipation member 22 and the support ring 16 absorbs energy to prevent the lower spring seat 10 from failing and, therefore, provides temporary positional support to the coil spring.

Figure 5:
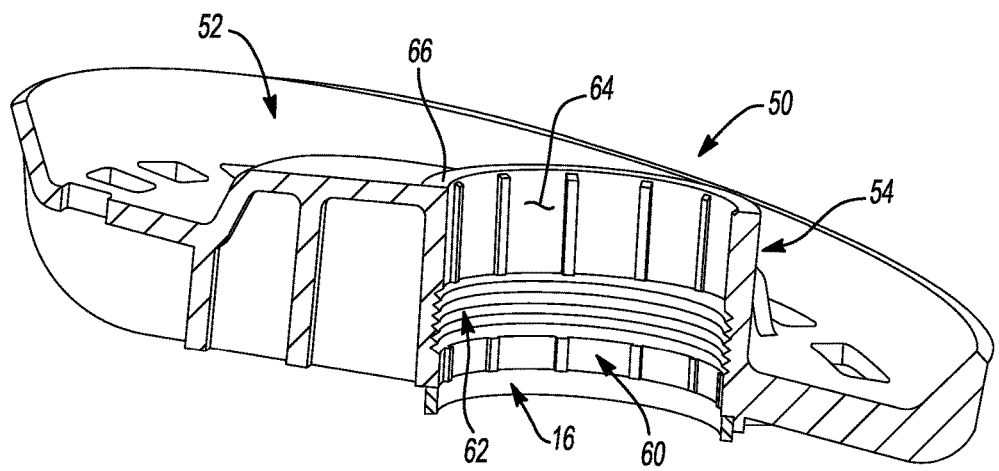
FIG. 5 illustrates a second embodiment of a lower spring seat of the present disclosure.
Figure 6:
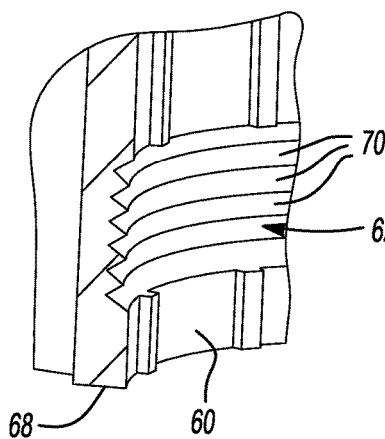
FIG. 6 illustrates an enlarged view of a primary member and a reinforcement member of the lower spring seat of FIG. 5.

FIGS. 5 and 6 illustrate a lower spring seat 50 in a second embodiment. Similar to the lower spring seat 10, the lower spring seat 50 includes an annular member 52 and a tubular member 54. The tubular member 54 abuts with the support ring 16. The lower spring seat 50 further includes a primary member 60 and an energy dissipation member 62. The primary member 60 and the energy dissipation member 62 are part of the tubular member 54.

Similar to the primary member 20, the primary member 60 is a lower seat of the tubular member 54 which abuts with the support ring 16. More particularly, an inner wall 64 of the tubular member 54 extends from a first end 66 to a second end 68. The support ring 16 abuts with the second end 68 which is part of the primary member 60 of the tubular member 14.

The energy dissipation member 62 is positioned above the primary member 60, such that the primary member 60 is between the energy dissipation member 62 and the support ring 16. The energy dissipation member 62 has multiple ribs 70 which circumferentially extend along the inner wall 64 of the tubular member 14. More particularly, the ribs 70 include multiple grooves and teeth that are alternately arranged along the inner wall 64.

The primary member 60 and the energy dissipation member 62 operate in a similar manner as the primary member 20 and the energy dissipation member 22, respectively. Specifically, the primary member 60 transfers load from the coil spring 3 to the support ring 16 during normal operating conditions. When a severe impact occurs, such as an impact which causes the failure of the coil spring 3, the primary member 60 collapses. The lower spring seat 50 moves down and the support ring 16 interfaces with the energy dissipation member 62. The friction and clamping between the ribs 70 of the energy dissipation member 62 and the support ring 16 absorbs the energy exerted on to the lower spring seat 50 after the deformation of the primary member 60, thereby preventing or controlling further damage to the lower spring seat 50 and/or coil spring.

Figure 7A:
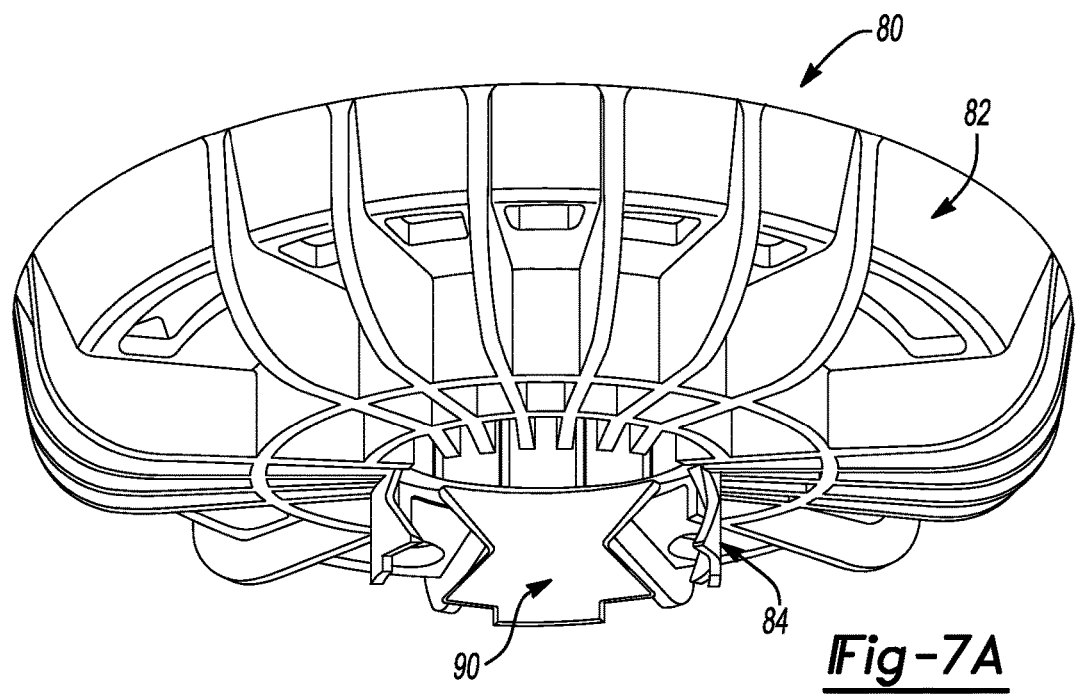
FIGS. 7A and 7B illustrate a third embodiment of a lower spring seat of the present disclosure.
Figure 7B:
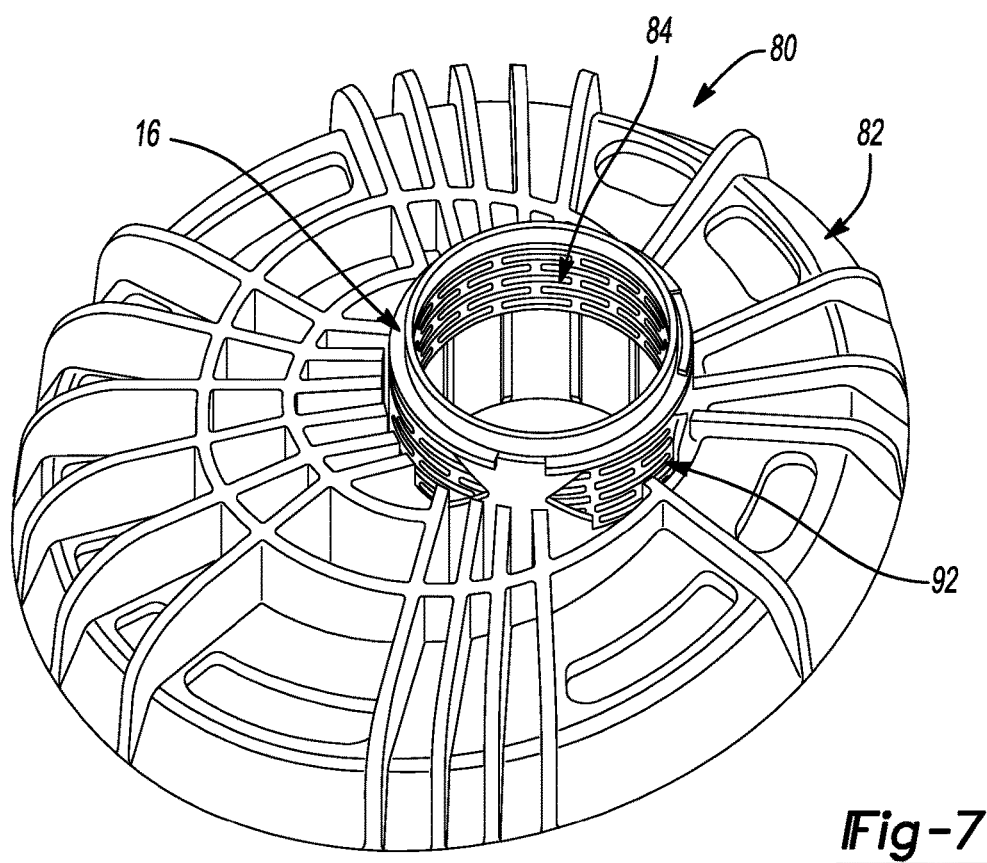

In the first and second embodiments, the primary member and the energy dissipation member (either member 22 or member 62) are integrated with the lower spring seat. Alternatively, the energy dissipation member 22 or 62 may be made of a different material and attached to the lower spring seat. For example, FIGS. 7A and 7B illustrate a lower spring seat 80 which has an annular member 82 and a tubular member 84. The tubular member 84 includes a primary member 90 and an energy dissipation member 92. The primary member 90 is made of the same material as the lower spring seat 80 (e.g., plastic). Based on the material, the structure of the primary member 90 is designed to transmit normal loads from the coil spring 3 to the support ring 16 and to deform in the event of a high impact.

The energy dissipation member 92 is made of a different material than the lower spring seat 80. Since the energy dissipation member 92 absorbs energy after the deformation of the primary member 90, the energy dissipation member 92 has softer characteristics than the primary member 90. The structure and the material of the energy dissipation member 92 can be altered to achieve a desired rigidity. For example, if the material of the energy dissipation member 92 is plastic reinforced with glass fibers, which is harder than plastic, the structure of the energy dissipation member 92 is configured to provide the softer properties associated with energy dissipation member 92. By incorporating a different material for the energy dissipation member 92, the structural configuration of the energy dissipation member 92 is no longer limited by the material of the lower spring seat 80.

The lower spring seat of the present disclosure includes a first structure (i.e., primary member) that provides static strength when subjected to normal loads and collapses when subjected to an impact. When the first structure collapses, the energy from the impact dissipates such that the lower spring seat remains in substantially one piece for supporting the coil spring. The lower spring seat further includes a second structure (i.e., an energy dissipation member) that absorbs energy after the deformation of the first structure. The second structure provides temporary support to the lower spring seat which supports the coil spring, so that the vehicle is able to travel to a safe area, such as a garage. The lower spring seat preserves the lightweight benefits associated with plastic components without compromising on performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A strut assembly for use with a vehicle, the strut assembly including:
    a shock absorber having a shock absorber tube;
    a coil spring;
    a lower spring seat for supporting one end of the spring, the lower spring seat including:
    a tubular member having an inner wall surface, and configured to receive the shock absorber tube therein;
    an annular member extending radially outwardly from the tubular member, and having a surface for supporting the one end of the coil spring thereon, the tubular member having a deformable portion constructed to deform and collapse in response to a predetermined excessive force experienced by the shock absorber, thus enabling the coil spring to be retained by the strut assembly, wherein the tubular member further comprises an energy dissipation member spaced apart from the deformable portion; and
    a metallic support ring positioned adjacent the deformable portion of the tubular member and being fixedly secured to a portion of the shock absorber tube, wherein the metallic support ring is positioned in contact with the energy dissipation member after the deformable portion deforms in response to the excessive force.

2. The strut assembly of claim 1, wherein the deformable portion includes an inner wall portion of the tubular member, wherein the inner wall portion rests on the metallic support ring.

3. The strut assembly of claim 2, wherein the deformable portion is disposed between the energy dissipation member and the metallic support ring.

4. The strut assembly of claim 3, wherein the energy dissipation member comprises a tapering wall portion.

5. The strut assembly of claim 3, wherein the energy dissipation member comprises a plurality of closely spaced, alternating circumferential ribs and grooves.

6. The strut assembly of claim 2, wherein the energy dissipation member is made from a different material than a remainder of the lower spring seat.

7. The strut assembly of claim 6, wherein the energy dissipation member is made from a material which has softer characteristics than the primary member.

8. The strut assembly of claim 1, wherein the lower spring seat is comprised of plastic.

9. A strut assembly for use with a vehicle, the strut assembly including:
    a shock absorber having a shock absorber tube;
    a coil spring;
    a lower spring seat for supporting one end of the spring, the lower spring seat including:
    a tubular member having an inner wall surface, and configured to receive the shock absorber tube therein;
    a support ring secured to a portion of the shock absorber tube, and disposed adjacent the tubular member to support the tubular member thereon;
    the tubular member further including a primary member and an energy dissipation member spaced apart from one another on the inner wall surface, the primary member configured to deform, so as to be compressed, in response to a predetermined excessive force experienced by the shock absorber, such that the support ring engages the energy dissipation member and the tubular member is supported by the energy dissipation member on the support ring only after the deformation.

10. The strut assembly of claim 9, wherein the primary member is positioned adjacent the support ring.

11. The strut assembly of claim 10, wherein the primary member is disposed between the support ring and the energy dissipation member.

12. The strut assembly of claim 9, wherein the energy dissipation member includes a tapering wall portion.

13. The strut assembly of claim 9, wherein the energy dissipation member includes a series of interspersed circumferential ribs and grooves.

14. The strut assembly of claim 9, wherein the energy dissipation member is made from a material different from material used to form a remainder of the tubular member, and wherein the tubular member is made at least partially from plastic.

15. The strut assembly of claim 9, wherein the tubular member is made entirely of plastic.

16. A strut assembly for use with a vehicle, the strut assembly including:
   a shock absorber having a shock absorber tube;
   a coil spring;
   a lower spring seat for supporting one end of the spring, the lower spring seat including:
      a tubular member having an inner wall surface, and configured to receive the shock absorber tube therein;
      a metallic support ring fixed secured to a portion of the shock absorber tube, and disposed adjacent the tubular member to support the tubular member thereon;
      the tubular member further including a primary member and an energy dissipation member on the inner wall surface, the primary member configured to deform, so as to be compressed, in response to a predetermined excessive force experienced by the shock absorber, such that the tubular member is supported by the energy dissipation member on the support ring after the deformation;
      the energy dissipation member including at least one of:
         a tapering wall portion; or
         a series of interspersed, circumferential grooves and ribs; and
      wherein the primary member is positioned between the energy dissipation member and the support ring during normal operating conditions and wherein the support ring engages the energy dissipation member in response to experiencing the excessive force.

* * * * *